US012774356B2

(12) United States Patent
Saeki et al.

(10) Patent No.: US 12,774,356 B2
(45) Date of Patent: Oct. 27, 2026

(54) CURABLE RESIN COMPOSITION AND METHOD OF MANUFACTURING ARTICLE

(71) Applicant: CANON KABUSHIKI KAISHA, Tokyo (JP)

(72) Inventors: Kazuho Saeki, Kanagawa (JP); Takayuki Hiratani, Tokyo (JP); Ryo Ogawa, Kanagawa (JP); Kyohei Wada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/647,706

(22) Filed: Apr. 26, 2024

(65) Prior Publication Data

US 2024/0287231 A1 Aug. 29, 2024

Related U.S. Application Data

(63) Continuation of application No. 17/683,033, filed on Feb. 28, 2022, now Pat. No. 11,987,658.

(30) Foreign Application Priority Data

Mar. 5, 2021 (JP) ................................ 2021-035297
Dec. 20, 2021 (JP) ................................ 2021-206090

(51) Int. Cl.
*C08F 220/40* (2006.01)
*C08F 2/50* (2006.01)
(Continued)

(52) U.S. Cl.
CPC .............. *C08F 220/40* (2013.01); *C08F 2/50* (2013.01); *C08F 222/102* (2020.02);
(Continued)

(58) Field of Classification Search
None
See application file for complete search history.

(56) References Cited

U.S. PATENT DOCUMENTS 11,667,741 B2 * 6/2023 Oishi .................... B29C 64/129
522/64
11,673,983 B2 * 6/2023 Oishi .................... C08F 220/06
522/64
11,987,658 B2 * 5/2024 Saeki ........................ C09D 4/00

FOREIGN PATENT DOCUMENTS

WO 2020085166 A1 4/2020
WO 2020162475 A1 8/2020

* cited by examiner

Primary Examiner — Sanza L. McClendon
(74) *Attorney, Agent, or Firm* — Canon U.S.A., Inc. IP Division

(57) ABSTRACT

A curable resin composition that is capable of forming a cured product having impact resistance and a high elastic modulus, and has a low viscosity, thereby being suitable for three-dimensional shaping. The curable resin composition contains: (A) an α-(unsaturated alkoxyalkyl)acrylic acid or an ester thereof; (B) a bifunctional radically polymerizable oligomer; optionally (C) a radically polymerizable compound other than the component (A) and the component (B); (D) rubber particles; and (E) a radical polymerization initiator, wherein the component (A) is represented by the following formula (1).

formula (1)

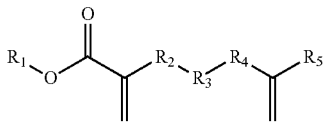

22 Claims, 1 Drawing Sheet

(51) Int. Cl.
*C08F 222/10* (2006.01)
*C08L 51/04* (2006.01)

(52) U.S. Cl.
CPC ........... *C08L 51/04* (2013.01); *C08L 2205/18* (2013.01); *C08L 2207/53* (2013.01)

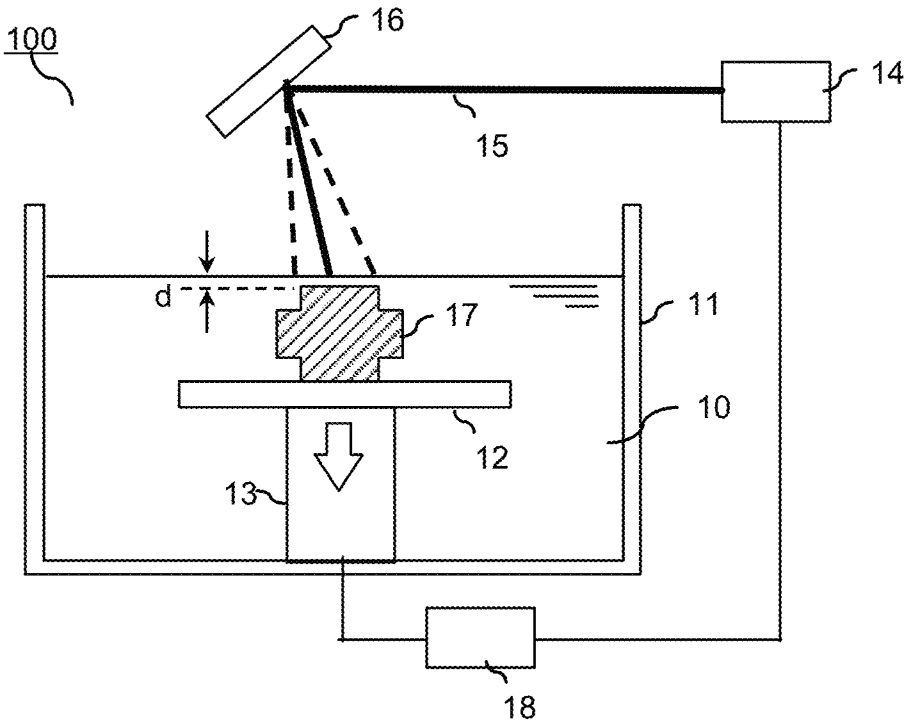
100
16
14
15
d
11
17
10
12
13
18

CURABLE RESIN COMPOSITION AND METHOD OF MANUFACTURING ARTICLE

CROSS-REFERENCE TO RELATED APPLICATION

This application is a Continuation U.S. application Ser. No. 17/683,033, filed Feb. 28, 2022, which claims priority from Japanese Patent Application No. 2021-035297, filed Mar. 5, 2021, and Japanese Patent Application No. 2021-206090, filed Dec. 20, 2021, each of which are hereby incorporated by reference herein in their entirety.

BACKGROUND OF THE INVENTION

Field of the Invention

The present disclosure relates to a curable resin composition and a cured product thereof, and to a method of manufacturing an article.

Description of the Related Art

There is known an optical three-dimensional shaping method (hereinafter referred to as optical shaping method) involving repeating a process of selectively irradiating a photocurable resin composition with light based on a three-dimensional shape of a three-dimensional model to form a cured resin layer, to thereby produce a shaped object in which the cured resin layers are integrally stacked.

Specifically, a liquid surface of a photocurable resin composition in a liquid state accommodated in a container is irradiated with light from an ultraviolet laser, a UV-LED, or the like according to slice data generated from shape data on a three-dimensional model to be produced, to thereby form a cured resin layer having a desired pattern with a predetermined thickness. Then, the photocurable resin composition in an amount corresponding to one layer is supplied onto the cured resin layer, and is similarly irradiated with light, to thereby stack and form a new cured resin layer continuous to the previously formed cured resin layer. In this way, cured resin layers are stacked one after another in a pattern based on the slice data. Thus, a desired shaped object can be obtained. According to such optical shaping method, even an article of a complicated shape can easily be produced as long as shape data on the three-dimensional model is available. Progress has been made in application of the optical shaping method to shaping of a prototype for shape checking (rapid prototyping), and to shaping of a working model for testing functionality or shaping of a mold (rapid tooling). Further, in recent years, uses of the optical shaping method have started to expand into shaping of an actual product (rapid manufacturing).

As a characteristic of the resin composition to be used for optical shaping, a low viscosity is required from the viewpoints of handleability at the time of shaping, and shaping accuracy. Further, against the background of the expanding range of application as described above, there is a demand that a cured product of the resin composition have such impact resistance and a high elastic modulus as to be comparable to those of a general-purpose engineering plastic.

In Japanese Patent Application Laid-Open No. 2004-051665, there is a disclosure of a curable resin composition containing a urethane (meth)acrylate having a specific structure, a radically polymerizable compound, elastomer particles, and a radical polymerization initiator. In addition, in Japanese Patent Application Laid-Open No. 2020-505255, there is a disclosure of a curable resin composition containing a cyclopolymerizable monomer having an acrylate moiety and an ethenyl or ethynyl moiety, in which the α-carbon of the acrylate moiety and the α-carbon of the ethenyl or ethynyl moiety have a 1,5-, 1,6-, 1,7-, or 1,8-relationship.

However, the curable resin composition disclosed in Japanese Patent Application Laid-Open No. 2004-051665 has not achieved sufficient characteristics from the viewpoints of the viscosity and the impact resistance of the cured product. In addition, the curable resin composition disclosed in Japanese Patent Application Laid-Open No. 2020-505255 has a low viscosity, but has a disadvantage in that the cured product thereof, though having a high elastic modulus, does not have sufficient impact resistance.

SUMMARY OF THE INVENTION

As described above, a curable resin composition that simultaneously satisfies a low viscosity and a high elastic modulus and impact resistance of a cured product has not been achieved.

An aspect of the present disclosure is to provide a curable resin composition that provides a cured product having impact resistance and a high elastic modulus, and has a low viscosity, thereby being excellent in handleability at the time of shaping.

A curable resin composition according to the present disclosure is a curable resin composition including the following components: (A) an α-(unsaturated alkoxyalkyl) acrylic acid or an ester thereof; (B) a bifunctional radically polymerizable oligomer; optionally (C) a radically polymerizable compound other than the component (A) and the component (B); (D) rubber particles; and (E) a radical polymerization initiator, wherein the component (A) is an α-(unsaturated alkoxyalkyl)acrylic acid or an ester thereof represented by formula (1):

formula (1)

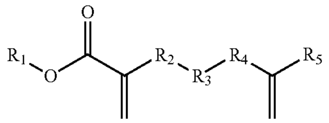

where: $R_1$ represents a hydrogen atom or an organic group having 1 or more and 30 or less carbon atoms; $R_2$ represents a methylene group that may be substituted with an alkyl group having 1 or more and 4 or less carbon atoms; any one of $R_3$ and $R_4$ represents a methylene group that may have an alkyl group having 1 or more and 4 or less carbon atoms, and another thereof represents an oxygen atom; and $R_5$ represents any one of a hydrogen atom, an alkyl group having 1 or more and 4 or less carbon atoms, and an ester group, wherein the component (B) is a bifunctional radically polymerizable oligomer formed of: an oligomer moiety in which two or more monomer units are linked together via any one of a carbonate group, an ester group, and an ether group; and two polymerizable functional groups, and wherein, when the curable resin composition comprises the component (C), the component (C) contains a monofunctional radically polymerizable compound at a content of more than 75 parts by mass with respect to 100 parts by mass in total of the component (C).

Further features of the present disclosure will become apparent from the following description of exemplary embodiments with reference to the attached drawing.

BRIEF DESCRIPTION OF THE DRAWINGS

FIGURE is an illustration of a configuration example of an optical shaping apparatus.

DESCRIPTION OF THE EMBODIMENTS

Embodiments of the present disclosure are described below. The embodiments described below are merely some of the embodiments of the present disclosure, and the present disclosure is not limited to these embodiments.

Component (A): α-(Unsaturated Alkoxyalkyl)Acrylic Acid or Ester Thereof

A component (A) is an α-(unsaturated alkoxyalkyl)acrylic acid or an ester thereof represented by the following general formula (1).

General formula (1)

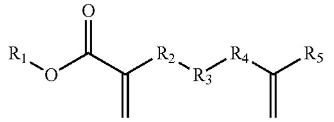

In the general formula (1), $R_1$ represents a hydrogen atom or an organic group having 1 or more and 30 or less carbon atoms. The organic group represented by $R_1$ is preferably a hydrocarbon group. The hydrocarbon group is formed of a hydrocarbon and may have an ether structure, and a hydrogen atom of the hydrocarbon may be substituted with a substituent. In addition, the organic group may be linear, may be branched, or may have a cyclic structure.

Examples of the hydrocarbon group include a chain saturated hydrocarbon group having 1 or more carbon atoms, a chain unsaturated hydrocarbon group having 3 or more carbon atoms, an alicyclic hydrocarbon group having 3 or more carbon atoms, and an aromatic hydrocarbon group having 6 or more carbon atoms.

Of those, a chain saturated hydrocarbon group having 1 or more and 20 or less carbon atoms, a chain unsaturated hydrocarbon group having 3 or more and 20 or less carbon atoms, an alicyclic hydrocarbon group having 3 or more and 20 or less carbon atoms, or an aromatic hydrocarbon group having 6 or more and 20 or less carbon atoms is preferred, and a chain saturated hydrocarbon group having 1 or more and 10 or less carbon atoms is more preferred.

For example, the chain saturated hydrocarbon group only needs to be a linear or branched hydrocarbon group, and is not particularly limited. Suitable examples thereof include methyl, ethyl, n-propyl, i-propyl, n-butyl, n-amyl, s-amyl, t-amyl, neopentyl, n-hexyl, s-hexyl, n-heptyl, n-octyl, s-octyl, t-octyl, 2-ethylhexyl, capryl, nonyl, decyl, undecyl, lauryl, tridecyl, myristyl, pentadecyl, cetyl, heptadecyl, stearyl, nonadecyl, eicosyl, ceryl, and melissyl groups. In addition, a group obtained by substituting at least part of the hydrogen atoms bonded to the constituent carbon atoms of a chain saturated hydrocarbon group with a halogen atom, a cyano group, a trimethylsilyl group, or the like may be adopted.

The chain unsaturated hydrocarbon group only needs to be a linear or branched hydrocarbon group having at least one non-aromatic carbon-carbon unsaturated bond, and is not particularly limited. Suitable examples thereof include crotyl, 1,1-dimethyl-2-propenyl, 2-methyl-butenyl, 3-methyl-2-butenyl, 3-methyl-3-butenyl, 2-methyl-3-butenyl, oleyl, linoleic, and linolenic groups.

The alicyclic hydrocarbon group only needs to be a hydrocarbon group having a saturated cyclic structure that is a three or more membered ring, or a non-aromatic unsaturated cyclic structure, and is not particularly limited. Suitable examples thereof include cyclopentyl, cyclopentylmethyl, cyclohexyl, cyclohexylmethyl, 4-methylcyclohexyl, 4-t-butylcyclohexyl, tricyclodecanyl, isobornyl, adamantyl, dicyclopentanyl, and dicyclopentenyl groups.

The aromatic hydrocarbon group only needs to be a hydrocarbon group having an aromatic cyclic structure that is a six or more membered ring, and is not particularly limited. Suitable examples thereof include phenyl, methylphenyl, dimethylphenyl, trimethylphenyl, 4-t-butylphenyl, benzyl, diphenylmethyl, diphenylethyl, triphenylmethyl, cinnamyl, naphthyl, and anthranyl groups.

A monovalent organic group formed of a hydrocarbon skeleton having an ether bond only needs to be a group having a structure in which an oxygen atom is inserted into at least one carbon-carbon bond forming a chain saturated hydrocarbon group, a chain unsaturated hydrocarbon group, an alicyclic hydrocarbon group, or an aromatic hydrocarbon group, and is not particularly limited. Suitable examples thereof include: chain ether groups, such methoxyethyl, as methoxyethoxyethyl, methoxyethoxyethoxyethyl, 3-methoxybutyl, ethoxyethyl, and ethoxyethoxyethyl groups; groups each having a combination of an alicyclic hydrocarbon group and a chain ether group, such as cyclopentoxyethyl, cyclohexyloxyethyl, cyclopentoxyethoxyethyl, cyclohexyloxyethoxyethyl, and dicyclopentenyloxyethyl groups; groups each having a combination of an aromatic hydrocarbon group and a chain ether group, such as phenoxyethyl and phenoxyethoxyethyl groups; and cyclic ether groups, such as glycidyl, β-methylglycidyl, β-ethylglycidyl, 3,4-epoxycyclohexylmethyl, 2-oxetanemethyl, 3-methyl-3-oxetanemethyl, 3-ethyl-3-oxetanemethyl, tetrahydrofuranyl, tetrahydrofurfuryl, tetrahydropyranyl, dioxazolanyl, and dioxanyl groups.

$R_2$ represents a methylene group that may be substituted with an alkyl group having 1 or more and 4 or less carbon atoms. $R_3$ and $R_4$ are selected in such a manner that any one thereof represents a methylene group that may be substituted with an alkyl group having 1 or more and 4 or less carbon atoms, and the other represents an oxygen atom. Herein, it is preferred that $R_4$ represent a methylene group that may be substituted with an alkyl group having 1 or more and 4 or less carbon atoms, and $R_3$ represent an oxygen atom. It is more preferred that $R_2$ and $R_4$ each represent a methylene group, and $R_3$ represent an oxygen atom. In this case, an ether-containing ring structure having methylene groups arranged on both sides is formed through polymerization, and hence a cured product achieving both of a high elastic modulus and impact resistance can easily be obtained.

$R_5$ represents any one of a hydrogen atom, an alkyl group having 1 or more and 4 or less carbon atoms, and an ester group. Of those, from the viewpoint of the impact resistance of the cured product, it is preferred that the moiety represented by $R_5$ be not bulky and not hamper the flexibility of the main chain, and for this reason, a hydrogen atom, a methyl group, a methyl ester group, or an ethyl ester group is preferred. $R_5$ more preferably represents a hydrogen atom.

Examples of the name of a compound suitable as the component (A) include α-allyloxymethylacrylic acid, methyl α-allyloxymethylacrylate, ethyl α-allyloxymethylacrylate, n-propyl α-allyloxymethylacrylate, i-propyl α-allyloxymethylacrylate, n-butyl α-allyloxymethylacrylate, n-amyl α-allyloxymethylacrylate, s-amyl α-allyloxymethylacrylate, t-amyl α-allyloxymethylacrylate, neopentyl α-allyloxymethylacrylate, n-hexyl allyloxymethylacrylate, s-hexyl α-allyloxymethylacrylate, n-heptyl α-allyloxymethylacrylate, n-octyl α-allyloxymethylacrylate, s-octyl allyloxymethylacrylate, t-octyl α-allyloxymethylacrylate, 2-ethylhexyl α-allyloxymethylacrylate, capryl α-allyloxymethylacrylate, nonyl α-allyloxymethylacrylate, decyl α-allyloxymethylacrylate, undecyl α-allyloxymethylacrylate, lauryl α-allyloxymethylacrylate, tridecyl α-allyloxymethylacrylate, myristyl α-allyloxymethylacrylate, pentadecyl α-allyloxymethylacrylate, cetyl α-allyloxymethylacrylate, heptadecyl α-allyloxymethylacrylate, stearyl α-allyloxymethylacrylate, nonadecyl α-allyloxymethylacrylate, eicosyl α-allyloxymethylacrylate, ceryl α-allyloxymethylacrylate, melissyl α-allyloxymethylacrylate, crotyl α-allyloxymethylacrylate, 1,1-dimethyl-2-propenyl α-allyloxymethylacrylate, 2-methylbutenyl α-allyloxymethylacrylate, 3-methyl-2-butenyl α-allyloxymethylacrylate, 3-methyl-3-butenyl α-allyloxymethylacrylate, 2-methyl-3-butenyl α-allyloxymethylacrylate, oleyl α-allyloxymethylacrylate, linoleic α-allyloxymethylacrylate, linolenic α-allyloxymethylacrylate, cyclopentyl α-allyloxymethylacrylate, cyclopentylmethyl α-allyloxymethylacrylate, cyclohexyl α-allyloxymethylacrylate, cyclohexylmethyl α-allyloxymethylacrylate, 4-methylcyclohexyl α-allyloxymethylacrylate, 4-t-butylcyclohexyl α-allyloxymethylacrylate, tricyclodecanyl α-allyloxymethylacrylate, isobornyl α-allyloxymethylacrylate, adamantyl α-allyloxymethylacrylate, dicyclopentanyl α-allyloxymethylacrylate, dicyclopentenyl α-allyloxymethylacrylate, phenyl α-allyloxymethylacrylate, methylphenyl α-allyloxymethylacrylate, dimethylphenyl α-allyloxymethylacrylate, trimethylphenyl α-allyloxymethylacrylate, 4-t-butylphenyl α-allyloxymethylacrylate, benzyl α-allyloxymethylacrylate, diphenylmethyl α-allyloxymethylacrylate, diphenylethyl α-allyloxymethylacrylate, triphenylmethyl α-allyloxymethylacrylate, cinnamyl α-allyloxymethylacrylate, naphthyl α-allyloxymethylacrylate, anthranyl α-allyloxymethylacrylate, methoxyethyl α-allyloxymethylacrylate, methoxyethoxyethyl α-allyloxymethylacrylate, α-allyloxymethylacrylate, 3-methoxybutyl α-methoxyethoxyethoxyethyl allyloxymethylacrylate, ethoxyethyl α-allyloxymethylacrylate, ethoxyethoxyethyl α-allyloxymethylacrylate, cyclopentoxyethyl α-allyloxymethylacrylate, cyclohexyloxyethyl α-allyloxymethylacrylate, cyclopentoxyethoxyethyl α-allyloxymethylacrylate, cyclohexyloxyethoxyethyl α-allyloxymethylacrylate, α-allyloxymethylacrylate, phenoxyethyl α-dicyclopentenyloxyethyl allyloxymethylacrylate, phenoxyethoxyethyl α-allyloxymethylacrylate, glycidyl α-allyloxymethylacrylate, β-methylglycidyl α-allyloxymethylacrylate, β-ethylglycidyl α-allyloxymethylacrylate, 3,4-epoxycyclohexylmethyl α-allyloxymethylacrylate, 2-oxetanemethyl α-allyloxymethylacrylate, 3-methyl-3-oxetanemethyl α-allyloxymethylacrylate, 3-ethyl-3-oxetanemethyl α-allyloxymethylacrylate, tetrahydrofuranyl α-allyloxymethylacrylate, tetrahydrofurfuryl α-allyloxymethylacrylate, tetrahydropyranyl α-allyloxymethylacrylate, dioxazolanyl α-allyloxymethylacrylate, dioxanyl α-allyloxymethylacrylate, α-methallyloxymethylacrylic acid, methyl α-methallyloxymethylacrylate, ethyl α-methallyloxymethylacrylate, n-propyl α-methallyloxymethylacrylate, i-propyl α-methallyloxymethylacrylate, n-butyl α-methallyloxymethylacrylate, n-amyl α-methallyloxymethylacrylate, s-amyl α-methallyloxymethylacrylate, t-amyl α-methallyloxymethylacrylate, neopentyl α-methallyloxymethylacrylate, n-hexyl α-methallyloxymethylacrylate, s-hexyl α-methallyloxymethylacrylate, n-heptyl α-methallyloxymethylacrylate, n-octyl α-methallyloxymethylacrylate, s-octyl α-methallyloxymethylacrylate, t-octyl α-methallyloxymethylacrylate, 2-ethylhexyl α-methallyloxymethylacrylate, capryl α-methallyloxymethylacrylate, nonyl α-methallyloxymethylacrylate, decyl α-methallyloxymethylacrylate, undecyl α-methallyloxymethylacrylate, lauryl α-methallyloxymethylacrylate, tridecyl α-methallyloxymethylacrylate, myristyl α-methallyloxymethylacrylate, pentadecyl α-methallyloxymethylacrylate, cetyl α-methallyloxymethylacrylate, heptadecyl α-methallyloxymethylacrylate, stearyl α-methallyloxymethylacrylate, nonadecyl α-methallyloxymethylacrylate, eicosyl α-methallyloxymethylacrylate, ceryl α-methallyloxymethylacrylate, melissyl α-methallyloxymethylacrylate, crotyl α-methallyloxymethylacrylate, 1,1-dimethyl-2-propenyl α-methallyloxymethylacrylate, 2-methylbutenyl α-methallyloxymethylacrylate, 3-methyl-2-butenyl α-methallyloxymethylacrylate, 3-methyl-3-butenyl α-methallyloxymethylacrylate, 2-methyl-3-butenyl α-methallyloxymethylacrylate, oleyl α-methallyloxymethylacrylate, linoleic α-methallyloxymethylacrylate, linolenic α-methallyloxymethylacrylate, cyclopentyl α-methallyloxymethylacrylate, cyclopentylmethyl α-methallyloxymethylacrylate, cyclohexyl α-methallyloxymethylacrylate, cyclohexylmethyl α-methallyloxymethylacrylate, 4-methylcyclohexyl α-methallyloxymethylacrylate, 4-t-butylcyclohexyl α-methallyloxymethylacrylate, tricyclodecanyl α-methallyloxymethylacrylate, isobornyl α-methallyloxymethylacrylate, adamantyl α-methallyloxymethylacrylate, dicyclopentanyl α-methallyloxymethylacrylate, dicyclopentenyl α-methallyloxymethylacrylate, phenyl α-methallyloxymethylacrylate, methylphenyl α-methallyloxymethylacrylate, dimethylphenyl α-methallyloxymethylacrylate, trimethylphenyl α-methallyloxymethylacrylate, 4-t-butylphenyl α-methallyloxymethylacrylate, benzyl α-methallyloxymethylacrylate, diphenylmethyl α-methallyloxymethylacrylate, triphenylmethyl α-diphenylethyl α-methallyloxymethylacrylate, methallyloxymethylacrylate, cinnamyl α-methallyloxymethylacrylate, naphthyl α-methallyloxymethylacrylate, anthranyl α-methallyloxymethylacrylate, methoxyethyl α-methallyloxymethylacrylate, methoxyethoxyethyl α-methallyloxymethylacrylate, methoxyethoxyethoxyethyl α-methallyloxymethylacrylate, 3-methoxybutyl α-methallyloxymethylacrylate, ethoxyethyl α-methallyloxymethylacrylate, ethoxyethoxyethyl α-methallyloxymethylacrylate, cyclopentoxyethyl α-methallyloxymethylacrylate, cyclohexyloxyethyl α-methallyloxymethylacrylate, cyclopentoxyethoxyethyl α-methallyloxymethylacrylate, cyclohexyloxyethoxyethyl α-methallyloxymethylacrylate, dicyclopentenyloxyethyl α-methallyloxymethylacrylate, phenoxyethyl α-methallyloxymethylacrylate, phenoxyethoxyethyl α-methallyloxymethylacrylate, glycidyl α-methallyloxymethylacrylate, β-methylglycidyl α-methallyloxymethylacrylate, β-ethylglycidyl α-methallyloxymethylacrylate, 3,4-epoxycyclohexylmethyl α-methallyloxymethylacrylate, 2-oxetanemethyl α-methallyloxymethylacrylate, 3-methyl-3-oxetanemethyl α-methallyloxymethylacrylate, 3-ethyl-3-oxetanemethyl α-methallyloxymethylacrylate, tetrahydrofuranyl α-methallyloxymethylacrylate, tetrahydrofurfuryl α-methallyloxymethylacrylate, tetrahydropyranyl α-methallyloxymethylacrylate, dioxanyl α-methallyloxymethylacrylate, dimethyl-2,2'-[oxybis(methylene)]bis-2-propenoate, diethyl-2,2'-[oxybis(methylene)]bis-2-propenoate, di(n-propyl)-2,2'-[oxybis(methylene)]bis-2-propenoate, di(isopropyl)-2,2'-[oxybis(methylene)]bis-2-propenoate, di(n-butyl)-2,2'-[oxybis(methylene)]bis-2-propenoate, di(isobutyl)-2,2'-[oxybis(methylene)]bis-2-propenoate, di(t-butyl)-2,2'-[oxybis(methylene)]bis-2-propenoate, di(t-amyl)-2,2'-[oxybis(methylene)]bis-2-propenoate, di(stearyl)-2,2'-[oxybis(methylene)]bis-2-propenoate, di(lauryl)-2,2'-[oxybis(methylene)]bis-2-propenoate, di(2-ethylhexyl)-2,2'-[oxybis(methylene)]bis-2-propenoate, di(1-methoxyethyl)-2,2'-[oxybis(methylene)] bis-2-propenoate, di(1-ethoxyethyl)-2,2'-[oxybis (methylene)]bis-2-propenoate, dibenzyl-2,2'-[oxybis (methylene)]bis-2-propenoate, diphenyl-2,2'-[oxybis (methylene)]bis-2-propenoate, dicyclohexyl-2,2'-[oxybis (methylene)]bis-2-propenoate, di(t-butylcyclohexyl)-2,2'-di (dicyclopentadienyl)-2,2'-[oxybis(methylene)]bis-2-propenoate, [oxybis(methylene)]bis-2-propenoate, di(tricyclodecanyl)-2,2'-[oxybis(methylene)]bis-2-propenoate, di(isobornyl)-2,2'-[oxybis(methylene)]bis-2-propenoate, diadamantyl-2,2'-[oxybis(methylene)]bis-2-propenoate, and di(2-methyl-2-adamantyl)-2,2'-[oxybis(methylene)]bis-2-propenoate.

Of those, a compound that contains an ether structure in its main chain, and that polymerizes while forming a five-membered ring or a six-membered ring is preferred, and methyl α-allyloxymethylacrylate, ethyl α-allyloxymethylacrylate, methyl α-methallyloxymethylacrylate, or dimethyl-2,2'-[oxybis(methylene)]bis-2-propenoate may be more suitably used. Of those, methyl α-allyloxymethylacrylate, which forms such a ring structure as represented by the following structural formula (2) when polymerized, may be most suitably used from the viewpoints of the impact resistance and elastic modulus of the cured product.

Structural formula (2)

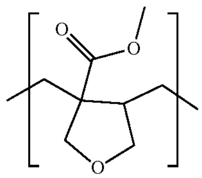

A possible reason why such structure provides particularly high impact resistance is that the ether bond of the tetrahydrofuran ring and the methylene groups adjacent to the tetrahydrofuran ring contribute to improving the flexibility of the main chain. Meanwhile, by virtue of the incorporation of the ring structure into the main chain, the cured product also has a high elastic modulus in addition to such impact resistance. A commercially available product of methyl α-allyloxymethylacrylate may be used, and is available, for example, under the name of AOMA from Nippon Shokubai Co., Ltd.

The content of the component (A) is not particularly limited, but from the viewpoint of the impact resistance of the cured product, is preferably more than 70 parts by mass and 100 parts by mass or less, more preferably 75 parts by mass or more and 100 parts by mass or less with respect to 100 parts by mass in total of the component (A) and a component (C). Further, the total content of the component (A) and the component (C) is preferably more than 70 parts by mass and less than 90 parts by mass with respect to 100 parts by mass in total of the component (A), a component (B), and the component (C). When the contents are set to fall within such ranges as described above, the impact resistance-improving effect resulting from the component (A) clearly appears.

Component (B): Bifunctional Radically Polymerizable Oligomer

The component (B) is a bifunctional radically polymerizable oligomer formed of: an oligomer moiety in which two or more monomer units are linked together via any one of a carbonate group, an ester group, and an ether group; and two polymerizable functional groups. Examples of the polymerizable functional groups include ethylenically unsaturated groups. Specific examples of the ethylenically unsaturated groups include (meth)acryloyl groups and vinyl groups. As used herein, the term "(meth)acryloyl group" means an acryloyl group or a methacryloyl group.

Examples of the component (B) include polycarbonate di(meth)acrylate, polyester di(meth)acrylate, and polyether di(meth)acrylate. Of those, the monomer units are preferably each formed of a hydrocarbon group from the viewpoint of impact resistance to be obtained in combined use with the component (A). As used herein, the term "monomer units" refers to a product obtained by removing an ether group, an ester group, or a carbonate group from the oligomer. Examples of the hydrocarbon group include a chain saturated hydrocarbon group, a chain unsaturated hydrocarbon group, an alicyclic hydrocarbon group, and an aromatic hydrocarbon group, and specific examples thereof include the same ones that are given in the description of the component (A). Of those, polycarbonate di(meth)acrylate or polyether di(meth)acrylate whose monomer units are each formed of a hydrocarbon group is preferred, and in particular, polycarbonate di(meth)acrylate whose monomer units are each a chain saturated hydrocarbon or an alicyclic hydrocarbon is more preferred.

The polycarbonate di(meth)acrylate, the polyester di(meth)acrylate, and the polyether di(meth)acrylate may be obtained by using a polycarbonate diol, a polyester diol, and a polyether diol, respectively, as a raw material, and giving each of both terminals thereof a (meth)acrylic group.

The polycarbonate diol may be represented by the following general formula (3).

General formula (3)

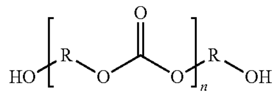

In the formula, "n" represents a number of 2 or more. R represents any group, and Rs may be identical to or different from each other.

The polycarbonate diol represented by the general formula (3) may be produced by any method, but for example, may be obtained by a transesterification reaction between a diol compound and a carbonic acid ester.

The diol compound serving as a raw material for the polycarbonate diol is not particularly limited, and examples thereof include: diols each having no side chain, such as ethylene glycol, 1,3-propanediol, 1,4-butanediol, 1,5-pentanediol, 1,6-hexanediol, 1,7-heptanediol, 1,8-octanediol, 1,9-nonanediol, 1,10-dodecanediol, 1,11-undecanediol, and 1,12-dodecanediol; diols each having a side chain, such as 2-methyl-1,8-octanediol, 2-ethyl-1,6-hexanediol, 2-methyl-1,3-propanediol, 2,2-dimethyl-1,3-propanediol, 3-methyl-1,5-pentanediol, 2,4-dimethyl-1,5-pentanediol, 2,4-diethyl-1,5-pentanediol, 2-butyl-2-ethyl-1,3-propanediol, and 2,2-dimethyl-1,3-propanediol; cyclic diols, such as 1,4-cyclohexanedimethanol and 2-bis(4-hydroxycyclohexyl)-propane; and diols each having an aromatic ring, such as hydroquinone, 1,4-benzenedimethanol, 3,6-bis(hydroxymethyl)durene, bisphenol A, bisphenol AP, bisphenol AF, bisphenol B, bisphenol BP, bisphenol C, bisphenol E, bisphenol F, bisphenol G, bisphenol M, bisphenol P, bisphenol PH, bisphenol TMC, bisphenol Z, 4,4'-dihydroxybiphenyl, and 4,4'-biphenyldimethanol. Further, one kind of diol or a combination of two or more kinds of diols out of those diols may be used.

Examples of the carbonic acid ester serving as a raw material of the polycarbonate diol include: dialkyl carbonates, such as dimethyl carbonate, diethyl carbonate, dipropyl carbonate, and dibutyl carbonate; diaryl carbonates, such as diphenyl carbonate; and alkylene carbonates, such as ethylene carbonate, trimethylene carbonate, 1,2-propylene carbonate, 1,2-butylene carbonate, 1,3-butylene carbonate, and 1,2-pentylene carbonate. Of those, one kind or two or more kinds of carbonic acid esters may be used as the raw material. A dialkyl carbonate and/or a diaryl carbonate is preferably used because a polycarbonate diol satisfying a specific primary terminal OH ratio can easily be obtained by adjusting conditions, such as a loading ratio between a diol and a carbonate. In addition, ethylene carbonate, dimethyl carbonate, diethyl carbonate, diphenyl carbonate, and dibutyl carbonate are more preferably used from the viewpoints of the availability and the ease with which the conditions of a polymerization reaction are set.

A commercially available product may also be suitably selected as the polycarbonate diol. A product corresponding to the present disclosure may be appropriately selected from, for example, DURANOL (trademark) (manufactured by Asahi Kasei Corporation), BENEBiOL (trademark) (manufactured by Mitsubishi Chemical Corporation), ETERNACOLL (trademark) (manufactured by Ube Industries. Ltd.), NIPPOLLAN (trademark) 981, 980R, 982R, 976, 965, 963, 964, and 968 (manufactured by Tosoh Corporation), and KURARAY POLYOL (trademark)C-2090 (manufactured by Kuraray Co., Ltd.).

The polyester diol may be represented by the following general formula (4).

General formula (4)

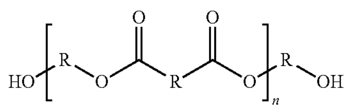

In the formula, "n" represents a number of 2 or more. R represents any group, and Rs may be identical to or different from each other.

The polyester diol represented by the general formula (4) may be produced by any method, but for example, may be obtained by a dehydration condensation reaction between a diol compound and a dicarboxylic acid.

The same diol compound as that serving as a raw material for the polycarbonate diol may be used as the diol compound serving as a raw material for the polyester diol.

The dicarboxylic acid serving as a raw material for the polyester diol is not particularly limited, and examples thereof include: aliphatic dicarboxylic acids, such as oxalic acid, malonic acid, succinic acid, glutaric acid, adipic acid, pimelic acid, suberic acid, azelaic acid, sebacic acid, undecanedicarboxylic acid, dodecanedicarboxylic acid, tetradecanedicarboxylic acid, fumaric acid, itaconic acid, and maleic acid; aromatic dicarboxylic acids, such as phthalic acid, isophthalic acid, terephthalic acid, tetrachlorophthalic acid, p-carboxyphenylacetic acid, p-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, and anthracenedicarboxylic acid; and alicyilc dicarboxylic acids, such as 1,4-cyclohexanedicarboxylic acid. One kind or two or more kinds of dicarboxylic acids out of the foregoing may be used as raw materials. In addition, the above-mentioned dicarboxylic acid may be subjected to the reaction in the form of an acid anhydride, and in that case, the acid anhydride reacts with water in the reaction system to produce the dicarboxylic acid.

A commercially available product may also be suitably selected as the polyester diol. A product corresponding to the present disclosure may be appropriately selected from, for example, diols of POLYLITE (trademark) (manufactured by DIC Corporation), MAXIMOL (trademark) RDK-133 and RDK-142 (manufactured by Kawasaki Kasei Chemicals Ltd.), NIPPOLLAN (trademark) 4002, 4040, 4009, 4010, 3027, 164, 4073, 136, 1004, 141, 4042, 5018, and 5035 (manufactured by Tosoh Corporation), diols of ADEKA NEWACE (trademark) (manufactured by ADEKA Corporation), KURARAY POLYOL (trademark) P-5010, P-2050, P-2010, P-2020, P-2030, P-1010, and P-2011 (manufactured by Kuraray Co., Ltd.), ARONIX (trademark) M-6000 series, M-7000 series, and M-9000 series (manufactured by Toagosei Co., Ltd.), and CN2203, CN2254, CN2270, CN2271, CN2273, and CN2274 manufactured by Sartomer Company Inc.

The polyether diol may be represented by the following general formula (5).

General formula (5)

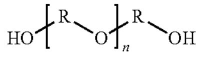

In the formula, "n" represents a number of 2 or more. R represents any group, and Rs may be identical to or different from each other.

The polyether diol represented by the general formula (5) may be produced by any method, but for example, may be obtained by subjecting a ring-opened polymer of a cyclic ether to addition polymerization. In addition, a copolymerized polyether diol obtained by subjecting one or more kinds of compounds selected from a diol compound, an alkylene oxide, oxetane, a cyclic acetal, 3-methyltetrahydrofuran, and 2-methyltetrahydrofuran to random copolymerization with the cyclic ether serving as a raw material may be used as a reaction starting material for ring-opening polymerization.

The same diol compound as that serving as a raw material for the polycarbonate diol may be used as the diol compound serving as a raw material for the polyether diol.

The cyclic ether serving as a raw material for the polyether diol is not particularly limited, and a cyclic ether, such as tetrahydrofuran (THF), ethylene oxide, propylene oxide, oxetane, tetrahydropyran, or oxepane, or a cyclic ether derivative in which part of a hydrocarbon of the cyclic ether is substituted with an alkyl group may be used. In addition, one kind or two or more kinds of cyclic ethers out of the forgoing may be used as the raw material.

A commercially available product may also be suitably selected as the polyether diol. A product corresponding to the present disclosure may be appropriately selected from, for example, EXCENOL (trademark) (manufactured by AGC Inc.), ADEKA POLYETHER (trademark) P, BPX, CM, and PR (manufactured by ADEKA Corporation), SANNIX (trademark) PL-2100 and PP (manufactured by Sanyo Chemical Industries, Ltd.), and Toho Polyol (manufactured by Toho Chemical Industry Co., Ltd.).

The weight-average molecular weight (Mw) of the component (B) is preferably 400 or more and 5,000 or less, more preferably 400 or more and 4,000 or less. A case in which the weight-average molecular weight is 400 or more is preferred because the impact resistance of a cured product tends to be increased along with a reduction in crosslink density. In addition, when the weight-average molecular weight is 5,000 or less, high mechanical strength can easily be obtained as well as the impact resistance. In addition, also from the viewpoint of the viscosity of a curable resin composition, the weight-average molecular weight is preferably 5,000 or less.

The weight-average molecular weight (Mw) of the component (B) is a weight-average molecular weight in terms of the molecular weight of standard polystyrene, and is measured using a high-performance liquid chromatograph (manufactured by Tosoh Corporation, high-performance GPC apparatus "HLC-8220GPC") with two Shodex GPCLF-804 columns (exclusion limit molecular weight: $2\times10^6$, separation range: 300 to $2\times10^6$) in series.

The content of the component (B) is not particularly limited, but is desirably more than 10 parts by mass with respect to 100 parts by mass in total of the component (A), the component (B), and the component (C). The content of the component (B) is more preferably more than 10 parts by mass and less than 30 parts by mass. When the content of the component (B) is more than 10 parts by mass, impact resistance satisfactory as a cured product physical property can easily be obtained. Further, when the content of the component (B) is less than 30 parts by mass, high mechanical strength can easily be obtained as well as the impact resistance.

The inventors of the present disclosure have made extensive investigations regarding the conditions of an oligomer capable of achieving both of impact resistance and a high elastic modulus when combined with a mixed system of the component (A) and a component (D) to be described later. As a result, the inventors have recognized that, when the oligomer is a bifunctional radically polymerizable oligomer having two or more monomer units linked together via any one of a carbonate group, an ester group, and an ether group as described above, excellent impact resistance and a high elastic modulus that are beyond expectations are expressed. In order to describe the reason therefor, a polyfunctional urethane oligomer deviating from the scope of the present disclosure is considered. In general, the polyfunctional urethane oligomer has a structure formed of a hard segment and a soft segment, and has urethane bonds interacting with each other via a hydrogen bond, and hence is suitably used as a crosslinking agent to impart impact resistance and a high elastic modulus to a cured product. Meanwhile, a conceivable factor of the peculiar impact resistance obtained in the mixed system of the component (A) and the component (D) is as follows: the flexibility of the main chain of the component (A) resulting from the peculiar molecular structure thereof allows an external stress to be effectively transmitted to the component (D) via a polymer network, leading to the occurrence of stress relaxation. In order to make the most of that effect, it is desired that an interaction, such as the hydrogen bond between the urethane bonds, be absent between crosslinked networks. In order to eliminate the reduction in flexibility of the polymer network resulting from the urethane bonds, the use of a urethane oligomer having a lengthened soft segment is conceivable, but in that case, there arises a disadvantage in that the elastic modulus is reduced along with a reduction in crosslink density. Meanwhile, in the case of the bifunctional radically polymerizable oligomer having two or more monomer units linked together via any one of a carbonate group, an ester group, and an ether group, the interaction between the crosslinked networks is weak. Accordingly, while the flexibility of the main chain resulting from the component (A) is kept, the elastic modulus can be improved by crosslinking. Further, when the monomer units are each a hydrocarbon group having no heteroatom, the interaction between the crosslinked networks becomes lower, and hence a higher level of impact resistance can be achieved. In addition, as a noteworthy finding, it has been found that, in the mixed system of the component (A) and the oligomer of the present disclosure, even when the oligomer has a low molecular weight and a relatively high crosslink density, specifically a weight-average molecular weight of 400 or more and 5,000 or less, a high level of impact resistance can be kept. When the number of functional groups of the oligomer is 3 or more, impact resistance comparable to that of the present disclosure is not expressed. A conceivable reason therefor is that the flexibility of the polymer network is significantly reduced owing to excessive crosslinking, leading to the occurrence of stress concentration on part of the polymer network in response to an external force.

Component (C): Radically Polymerizable Compound Other Than Component (A) and Component (B)

The curable resin composition of the present disclosure may contain, as the component (C), a radically polymerizable compound other than the component (A) and the component (B). When the curable resin composition contains the component (C), a monofunctional radically polymerizable compound accounts for more than 75 parts by mass with respect to 100 parts by mass in total of the component (C). The content of the monofunctional radically polymerizable compound is preferably 80 parts by mass or more, more preferably 90 parts by mass or more with respect to 100 parts by mass in total of the component (C). When the component (C) contains 25 parts by mass or more of a polyfunctional radically polymerizable compound with respect to 100 parts by mass in total thereof, impact resistance cannot be sufficiently expressed. An example of the radically polymerizable functional group is an ethylenically unsaturated group. Specific examples of the ethylenically unsaturated group include a (meth)acryloyl group and a vinyl group.

Examples of the monofunctional radically polymerizable compound having a (meth)acryloyl group include a monofunctional acrylamide-based compound and a monofunctional (meth)acrylate-based compound.

Examples of the monofunctional acrylamide-based compound include (meth)acrylamide, N-methyl(meth)acrylamide, N-isopropyl(meth)acrylamide, N-tert-butyl(meth)acrylamide, N-phenyl(meth)acrylamide, N-methylol (meth) acrylamide, N,N-diacetone (meth)acrylamide, N,N-dimethyl(meth)acrylamide, N,N-diethyl(meth)acrylamide, N,N-dipropyl(meth)acrylamide, N,N-dibutyl(meth)acrylamide, N-(meth)acryloylmorpholine, N-(meth)acryloylpiperidine, and N-[3-(dimethylamino)propyl]acrylamide.

In addition, examples of the monofunctional (meth)acrylate-based compound include methyl (meth)acrylate, ethyl (meth)acrylate, n-butyl (meth)acrylate, isobutyl (meth)acrylate, t-butyl (meth)acrylate, 2-ethylhexyl (meth)acrylate, n-octyl (meth)acrylate, i-octyl (meth)acrylate, lauryl (meth) acrylate, stearyl (meth)acrylate, cyclohexyl (meth)acrylate, isobornyl (meth)acrylate, adamantyl (meth)acrylate, 3-hydroxy-1-adamantyl (meth)acrylate, 3,5-dihydroxy-1-adamantyl (meth)acrylate, 2-methyl-2-adamantyl (meth)acrylate, 2-ethyl-2-adamantyl (meth)acrylate, 2-isopropyl-2-adamantyl (meth)acrylate, 2-hydroxyethyl (meth)acrylate, 2-hydroxypropyl (meth)acrylate, 2-hydroxybutyl (meth) acrylate, 4-hydroxybutyl (meth)acrylate, glycidyl (meth) acrylate, 3-methyl-3-oxetanyl-methyl (meth)acrylate, tetrahydrofurfuryl (meth)acrylate, phenylglycidyl (meth) acrylate, dimethylaminomethyl (meth)acrylate, phenyl cellosolve (meth)acrylate, dicyclopentenyl (meth)acrylate, dicyclopentenyloxyethyl (meth)acrylate, biphenyl (meth) acrylate, 2-hydroxyethyl (meth)acryloyl phosphate, phenyl (meth)acrylate, phenoxyethyl (meth)acrylate, phenoxypropyl (meth)acrylate, benzyl (meth)acrylate, butoxytriethylene glycol (meth)acrylate, 2-ethylhexyl polyethylene glycol (meth)acrylate, nonylphenyl polypropylene glycol (meth) acrylate, methoxy dipropylene glycol (meth)acrylate, glycerol (meth)acrylate, trifluoromethyl (meth)acrylate, trifluoroethyl (meth)acrylate, tetrafluoropropyl (meth)acrylate, octafluoropentyl acrylate, polyethylene glycol (meth)acrylate, polypropylene glycol (meth)acrylate, allyl (meth)acrylate, 2,2,2-trifluoroethyl (meth)acrylate, 2,2,3,3-tetrafluoropropyl (meth)acrylate, 1H,1H,5H,octafluoropentyl (meth) acrylate epichlorohydrin-modified butyl (meth)acrylate, epichlorohydrin-modified phenoxy (meth)acrylate, ethylene oxide (EO)-modified phthalic acid (meth)acrylate, EO-modified succinic acid (meth)acrylate, caprolactone-modified 2-hydroxyethyl (meth)acrylate, N,N-dimethylaminoethyl (meth)acrylate, N,N-diethylaminoethyl (meth)acrylate, morpholino (meth)acrylate, EO-modified phosphoric acid (meth)acrylate, (meth)acrylates each having an imide group (product name: M-140, manufactured by Toagosei Co., Ltd.), and monofunctional (meth)acrylates each having a siloxane structure.

Examples of the monofunctional radically polymerizable compound having an ethylenically unsaturated group other than the (meth)acryloyl group include: styrene; styrene derivatives, such as vinyltoluene, α-methylstyrene, chlorostyrene, and styrenesulfonic acid and salts thereof; maleimides, such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; vinyl esters, such as vinyl acetate, vinyl propionate, vinyl pivalate, vinyl benzoate, and vinyl cinnamate; vinyl cyanide compounds, such as (meth)acrylonitrile; and N-vinyl-based compounds, such as N-vinylpyrrolidone, N-vinylcaprolactam, N-vinylimidazole, N-vinylmorpholine, and N-vinylacetamide.

Those monofunctional radically polymerizable compounds may be used alone or in combination thereof.

From the viewpoint of increasing a curing rate, the monofunctional radically polymerizable compound to be used in the present disclosure preferably contains at least a monofunctional acrylamide-based compound, a monofunctional N-vinyl-based compound, or a monofunctional (meth) acrylate-based compound. The monofunctional radically polymerizable compound particularly preferably contains a monofunctional acrylamide-based compound.

Examples of the polyfunctional radically polymerizable compound having two or more radically polymerizable functional groups in the molecule, which is contained as the component (C), include a polyfunctional (meth)acrylate-based compound, a vinyl ether group-containing (meth) acrylate-based compound, a polyfunctional (meth)acryloyl group-containing isocyanurate-based compound, a polyfunctional (meth)acrylamide-based compound, a polyfunctional maleimide-based compound, a polyfunctional vinyl ether-based compound, and a polyfunctional aromatic vinyl-based compound.

Examples of the polyfunctional (meth)acrylate-based compound may include ethylene glycol di(meth)acrylate, 1,3-butylene glycol di(meth)acrylate, 1,4-butanediol di(meth)acrylate, dimethyloltricyclodecane di(meth)acrylate, trimethylolpropane tri(meth)acrylate, neopentyl glycol di(meth)acrylate, 1,6-hexamethylene di(meth)acrylate, pentaerythritol tri(meth)acrylate, pentaerythritol tetra(meth) acrylate, ditrimethylolpropane tetraacrylate, dipentaerythritol tetra(meth)acrylate, dipentaerythritol penta(meth) acrylate, dipentaerythritol hexa(meth)acrylate, tris(meth) acryloxyethyl isocyanurate, a polyfunctional (meth)acrylate having a fluorine atom, and a polyfunctional (meth)acrylate having a siloxane structure.

Examples of the vinyl ether group-containing (meth) acrylate-based compound include 2-vinyloxyethyl (meth) acrylate, 4-vinyloxybutyl (meth)acrylate, and 4-vinyloxycyclohexyl (meth)acrylate.

Examples of the polyfunctional (meth)acryloyl group-containing isocyanurate-based compound include tri(acryloyloxyethyl) isocyanurate, tri(methacryloyloxyethyl) isocyanurate, and ε-caprolactone-modified tris-(2-acryloxyethyl) isocyanurate.

Examples of the polyfunctional (meth)acrylamide-based compound include N,N'-methylenebisacrylamide, N,N'-ethylenebisacrylamide, N,N'-(1,2-dihydroxyethylene)bisacrylamide, N,N'-methylenebismethacrylamide, and N,N',N"-triacryloyldiethylenetriamine.

Examples of the polyfunctional maleimide-based compound include 4,4'-diphenylmethanebismaleimide, m-phenylenebismaleimide, 4-methyl-1,3-phenylenebismaleimide, and 1,6-bismaleimide-(2,2,4-trimethyl)hexane.

Examples of the polyfunctional vinyl ether-based compound include ethylene glycol divinyl ether, propylene glycol divinyl ether, butylene glycol divinyl ether, hexanediol divinyl ether, a bisphenol A alkylene oxide divinyl ether, a bisphenol F alkylene oxide divinyl ether, trimethylolpropane trivinyl ether, ditrimethylolpropane tetravinyl ether, glycerin trivinyl ether, pentaerythritol tetravinyl ether, dipentaerythritol pentavinyl ether, and dipentaerythritol hexavinyl ether.

An example of the polyfunctional aromatic vinyl-based compound is divinylbenzene.

Those polyfunctional radically polymerizable compounds may be used alone or in combination thereof.

The content of the component (C) is not particularly limited, but is preferably 0 parts by mass or more and less than 30 parts by mass, more preferably 0 parts by mass or more and 25 parts by mass or less with respect to 100 parts by mass in total of the component (A) and the component (C), and may be 0 parts by mass. That is, the curable resin composition of the present disclosure may be free of the component (C). When the content of the component (C) is set to fall within such ranges, the impact resistance-improving effect resulting from the component (A) clearly appears in the cured product.

Component (D): Rubber Particles

The component (D) is rubber particles. The curable resin composition of the present disclosure can improve the impact resistance of the cured product by virtue of the addition of the rubber particles. The rubber particles to be used in the present disclosure are not particularly limited, but for example, butadiene rubber particles, styrene/butadiene copolymer rubber particles, or acrylonitrile/butadiene copolymer rubber particles may be used. Examples thereof also include saturated rubber particles obtained by hydrogenating or partially hydrogenating each of those diene rubbers, crosslinked butadiene rubber particles, isoprene rubber particles, chloroprene rubber particles, natural rubber particles, silicon rubber particles, ethylene/propylene/diene monomer ternary copolymer rubber particles, acrylic rubber particles, and silicone/acrylic composite rubber particles. Those rubber particles may be used alone or in combination thereof. Of those, at least one kind of particles selected from butadiene rubber particles, crosslinked butadiene rubber particles, styrene/butadiene copolymer rubber particles, acrylic rubber particles, and silicone/acrylic composite rubber particles are preferred from the viewpoint of flexibility.

The rubber particles are preferably rubber particles each having a multilayer structure (core-shell structure) formed of a core portion having rubber elasticity and at least one layer of a shell portion covering the core portion.

The glass transition temperature of a polymer for forming the core portion of each of the rubber particles is not particularly limited, but is preferably 0° C. or less, more preferably less than −10° C., still more preferably −40° ° C. or less. When the glass transition temperature of the polymer is set to 0° C. or less, the impact resistance of the cured product tends to be satisfactorily improved. The glass transition temperature of the polymer for forming the core portion means a value calculated by the following Fox equation. The following Fox equation represents a case in which the polymer for forming the core is a copolymer of a monomer 1, a monomer 2, . . . , and a monomer “n”.

$$1/Tg = W_1/Tg_1 + W_2/Tg_2 + \ldots + W_n/Tg_n$$

Tg: the glass transition temperature of the polymer for forming the core portion (unit: K)

$W_i$: the weight fraction of a monomer “i” with respect to the total amount of the constituent monomers of the polymer for forming the core portion $Tg_i$: the glass transition temperature of a homopolymer of the monomer “i” (unit: K)

A value given in the literature may be adopted for the glass transition temperature $Tg_i$ of the homopolymer. When no such value is given in the literature, the value of the glass transition temperature of a homopolymer obtained by polymerizing the monomer by a conventional method, the value being measured by differential scanning calorimetry, may be adopted.

The polymer for forming the core portion is not particularly limited, but is preferably formed of any one of a butadiene rubber, a crosslinked butadiene rubber, a styrene/butadiene copolymer rubber, an acrylic rubber, and a silicone/acrylic composite rubber.

A polymer for forming the shell layer of each of the rubber particles is preferably a polymer of a kind different from the polymer for forming the core portion.

As the polymer for forming the shell layer, a (meth)acrylic acid ester, such as methyl (meth)acrylate, ethyl (meth) acrylate, or butyl (meth)acrylate, maleimide, styrene, an α-(unsaturated alkoxyalkyl)acrylic acid or an ester thereof (component (A)), or the like may be used, but the present disclosure is not limited thereto.

The polymer for forming the shell layer may contain, as another monomer component, in the same manner as in the core portion, a reactive crosslinked monomer having two or more reactive functional groups in the molecule, such as divinylbenzene, allyl (meth)acrylate, ethylene glycol di(meth)acrylate, diallyl maleate, triallyl cyanurate, diallyl phthalate, or butylene glycol diacrylate, in addition to the above-mentioned monomer.

The glass transition temperature of the polymer for forming the shell layer of each of the rubber particles is not particularly limited, but is preferably 0° C. or more, more preferably 15° C. or more, still more preferably 30° C. or more. When the glass transition temperature of the shell layer is less than 0° C., the viscosity of the composition tends to be remarkably increased. When the glass transition temperature of the shell layer is 0° C. or more, the increase in viscosity does not occur, and the rubber particles tend to be satisfactorily dispersed in the composition. The glass transition temperature of the shell layer is a calculated value calculated by the above-mentioned Fox equation.

The rubber particles are each obtained by covering the core portion with the shell layer. As a method of covering the core portion with the shell layer, there are given, for example, a method involving applying the shell layer to the core portion, and a method involving grafting the shell layer onto the surface of the core portion. Of those, a method involving grafting the shell layer onto the surface of the core portion is preferred.

The average particle diameter of the rubber particles is not particularly limited, but is preferably 20 nm or more and 2,000 nm or less, more preferably 20 nm or more and 900 nm or less, still more preferably 30 nm or more and 800 nm or less. When the average particle diameter of the rubber particles is 20 nm or more, the impact resistance-improving effect resulting from the addition of the rubber particles clearly appears. In addition, when the average particle diameter is 2,000 nm or less, a cured product excellent in balance from the viewpoints of the elastic modulus and heat resistance as well as the impact resistance can easily be obtained.

The content of the component (D) is not particularly limited, but is preferably 5 parts by mass or more and 60 parts by mass or less with respect to 100 parts by mass in total of the component (A), the component (B), and the component (C). The content of the component (D) is more preferably 10 parts by mass or more and 40 parts by mass or less. When the content of the component (D) is set to fall within the above-mentioned ranges, a cured product excellent in balance between the impact resistance and the elastic modulus can easily be obtained.

Component (E): Radical Polymerization Initiator

A component (E) is a radical polymerization initiator. A photoradical polymerization initiator or a thermal radical polymerization initiator may be used as the radical polymerization initiator.

Photoradical polymerization initiators are mainly classified into an intramolecular cleavage type and a hydrogen abstraction type. When the intramolecular cleavage-type photoradical polymerization initiator absorbs light having a specific wavelength, a bond at a specific site is cleaved, and a radical is generated at the cleaved site to serve as a polymerization initiator to initiate the polymerization of an ethylenically unsaturated compound containing a (meth) acryloyl group. Meanwhile, the hydrogen abstraction type absorbs light having a specific wavelength to be brought into an excited state, and the resultant excited species causes a hydrogen abstraction reaction from a hydrogen donor present in the surroundings to generate a radical, which serves as a polymerization initiator to initiate the polymerization of a radically polymerizable compound.

As the intramolecular cleavage-type photoradical polymerization initiator, there are known an alkylphenone-based photoradical polymerization initiator, an acylphosphine oxide-based photoradical polymerization initiator, and an oxime ester-based photoradical polymerization initiator. Each of those initiators is of a type that generates a radical species through the α-cleavage of a bond adjacent to a carbonyl group. Examples of the alkylphenone-based photoradical polymerization initiator include a benzyl methyl ketal-based photoradical polymerization initiator, an α-hydroxyalkylphenone-based photoradical polymerization initiator, and an aminoalkylphenone-based photoradical polymerization initiator. Specific examples of the compound include, but not limited to: 2,2'-dimethoxy-1,2-diphenylethan-1-one (OMNIRAD (trademark) 651, manufactured by IGM RESINS B.V.) as the benzylmethyl ketal-based photoradical polymerization initiator; 2-hydroxy-2-methyl-1-phenylpropan-1-one (OMNIRAD (trademark) 1173, manufactured by IGM RESINS B.V.), 1-hydroxycyclohexyl phenyl ketone (OMNIRAD (trademark) 184, manufactured by IGM RESINS B.V.), 1-[4-(2-hydroxyethoxy)phenyl]-2-hydroxy-2-methyl-1-propan-1-one (OMNIRAD (trademark) 2959, manufactured by IGM RESINS B.V.), or 2-hydroxy-1-{4-[4-(2-hydroxy-2-methylpropionyl)benzyl] phenyl}-2-methylpropan-1-one (OMNIRAD (trademark) 127, manufactured by IGM RESINS B.V.) as the α-hydroxyalkylphenone-based photoradical polymerization initiator; and 2-methyl-1-(4-methylthiophenyl)-2-morpholinopropan-1-one (OMNIRAD (trademark) 907, manufactured by IGM RESINS B.V.) or 2-benzylmethyl-2-dimethylamino-1-(4-morpholinophenyl)-1-butanone (OMNIRAD (trademark) 369, manufactured by IGM RESINS B.V.) as the aminoalkylphenone-based photoradical polymerization initiator. Examples of the acylphosphine oxide-based photoradical polymerization initiator include, but not limited to, 2,4,6-trimethylbenzoyldiphenylphosphine oxide (Lucirin TPO, manufactured by BASF) and bis(2,4,6-trimethylbenzoyl)-phenylphosphine oxide (OMNIRAD (trademark) TPO H, manufactured by IGM RESINS B.V.). An example of the oxime ester-based photoradical polymerization initiator is, but not limited to, (2E)-2-(benzoyloxyimino)-1-[4-(phenylthio)phenyl]octan-1-one (Irgacure OXE-01, manufactured by BASF).

Examples of product names are shown together in the parentheses.

Examples of the hydrogen abstraction-type radical polymerization initiator include, but not limited to: anthraquinone derivatives, such as 2-ethyl-9,10-anthraquinone and 2-t-butyl-9,10-anthraquinone; and thioxanthone derivatives, such as isopropylthioxanthone and 2,4-diethylthioxanthone.

Those photoradical polymerization initiators may be used alone or in combination thereof. In addition, the photoradical polymerization initiators may also be used in combination with a thermal radical polymerization initiator to be described later.

The addition amount of the photoradical polymerization initiator is preferably 0.1 part by mass or more and 15 parts by mass or less with respect to 100 parts by mass in total of the component (A), the component (B), and the component (C). The addition amount is more preferably 0.1 part by mass or more and 10 parts by mass or less. When the amount of the photoradical polymerization initiator is 0.1 part by mass or more, polymerization proceeds sufficiently. When the addition amount of the polymerization initiator is 15 parts by mass or less, the molecular weight is moderately increased, and hence heat resistance and impact resistance are sufficiently obtained.

In addition, any hitherto known compound that generates a radical through heating may be used as the thermal radical polymerization initiator without any particular limitation, and preferred examples thereof may include an azo-based compound, a peroxide, and a persulfuric acid salt. Examples of the azo-based compound include 2,2'-azobisisobutyronitrile, 2,2'-azobis(methyl isobutyrate), 2,2'-azobis-2,4-dimethylvaleronitrile, and 1,1'-azobis(1-acetoxy-1-phenylethane). Examples of the peroxide include benzoyl peroxide, di-t-butylbenzoyl peroxide, t-butyl peroxypivalate and di(4-t-butylcyclohexyl) peroxydicarbonate. Examples of the persulfuric acid salt include persulfuric acid salts such as ammonium persulfate, sodium persulfate, and potassium persulfate.

The addition amount of the thermal radical polymerization initiator is preferably 0.1 part by mass or more and 15 parts by mass or less, more preferably 0.1 part by mass or more and 10 parts by mass or less with respect to 100 parts by mass in total of the component (A), the component (B), and the component (C). When the addition amount of the polymerization initiator is 15 parts by mass or less, the molecular weight is moderately increased, with the result that the heat resistance and the impact resistance are sufficiently obtained.

Other Non-Radically Polymerizable Components (Additives)

The curable resin composition of the present disclosure may contain various additives as other optional components, as long as the aspect and effects of the present disclosure are not impaired.

As a physical property modifier for imparting a desired physical property to a cured product, any of the following components may be added, for example: resins, such as an epoxy resin, polyurethane, polychloroprene, polyester, polysiloxane, a petroleum resin, a xylene resin, a ketone resin, and a cellulose resin; engineering plastics, such as polycarbonate, modified polyphenylene ether, polyamide, polyacetal, polyethylene terephthalate, polybutylene terephthalate, ultra-high molecular weight polyethylene, polyphenylsulfone, polysulfone, polyarylate, polyether imide, polyether ether ketone, polyphenylene sulfide, polyethersulfone, polyamide imide, a liquid crystal polymer, polytetrafluoroethylene, polychlorotrifluoroethylene, and polyvinylidene fluoride; a fluorine-based oligomer, a silicone-based oligomer, and a polysulfide-based oligomer; soft metals, such as gold, silver, and lead; and layered crystal structure substances, such as graphite, molybdenum disulfide, tungsten disulfide, boron nitride, graphite fluoride, calcium fluoride, barium fluoride, lithium fluoride, silicon nitride, molybdenum selenide.

In addition, a polymerization inhibitor, such as phenothiazine or 2,6-di-t-butyl-4-methylphenol, a benzoin compound, an acetophenone compound, an anthraquinone compound, a thioxanthone compound, a ketal compound, a benzophenone compound, a tertiary amine compound, or a xanthone compound may be added as a photosensitizer.

Examples of the other additive may include a polymerization initiation aid, a levelling agent, a wettability improving agent, a surfactant, a plasticizer, a UV absorbing agent, a silane coupling agent, an inorganic filler, a pigment, a dye, an antioxidant, a flame retardant, a thickening agent, and an antifoaming agent.

Curable Resin Composition

The composition of the present disclosure may be produced as described below. Appropriate amounts of the component (A), the component (B), the component (C), the component (D), and the component (E), or in the case of being free of the component (C), the component (A), the component (B), the component (D), and the component (E), and as required, other optional components are loaded into a stirring container, and stirred at generally 20° C. or more and 120° C. or less, preferably 40° C. or more and 100° C. or less. Then, dispersion treatment utilizing an ultrasonic wave, the removal of a volatile solvent, and the like are performed as required.

The curable resin composition according to the present disclosure may be suitably used as a shaping material to be used for an optical shaping method. That is, a shaped object of a desired shape may be produced by selectively irradiating the curable resin composition of the present disclosure with an active energy ray, such as an ultraviolet/visible ray, an electron beam, an X-ray, or a radiation, to supply energy required for curing. When the curable resin composition of the present disclosure is used as a shaping material for an optical shaping method, its viscosity at 25° C. is preferably 10 mPa·s or more and 10,000 mPa·s or less, more preferably 10 mPa·s or more and 5,000 mPa·s or less, still more preferably 10 mPa·s or more and 1,000 mPa·s or less, most preferably 10 mPa·s or more and 200 mPa·s or less.

Cured Product

A cured product of the present disclosure may be obtained by curing the above-mentioned curable resin composition through use of a known method, such as active energy ray irradiation or the application of heat. Examples of the active energy ray may include an ultraviolet/visible ray, an electron beam, an X-ray, and a radiation. Of those, an ultraviolet/visible ray having a wavelength of 300 nm or more and 450 nm or less may be preferably used because of ease of availability and compatibility with the photoradical polymerization initiator. An ultraviolet/visible ray laser (e.g., an Ar laser or a He—Cd laser), a mercury lamp, a xenon lamp, a halogen lamp, a fluorescent lamp, or the like may be used as a light source of the ultraviolet/visible ray. Of those, a laser light source is preferably adopted because an energy level can be increased to shorten a shaping time, and besides, a light condensing property is excellent and high shaping accuracy can be obtained. The curing method may be appropriately selected in accordance with the kind of the radical polymerization initiator contained in the curable resin composition. In addition, the curing methods may be used alone or in combination thereof.

Method of Shaping Article

The curable resin composition according to this embodiment may be suitably used for a method of manufacturing an article based on an optical three-dimensional shaping method (optical shaping method). The method of manufacturing an article using the curable resin composition according to this embodiment is described below.

A hitherto known method may be used as the optical shaping method. That is, the method of manufacturing an article according to this embodiment includes a step of curing the curable resin composition according to this embodiment at a predetermined thickness by selectively irradiating the curable resin composition with an active energy ray, such as light. In addition, the step of curing the curable resin composition at a predetermined thickness is performed a plurality of times to stack cured layers of the curable resin composition cured at predetermined thicknesses. Thus, an article is manufactured.

In FIGURE, a configuration example of a shaping apparatus making use of the optical shaping method is illustrated. An optical shaping apparatus 100 includes a tank 11 filled with a photocurable resin composition 10 in a liquid state. A shaping stage 12 is arranged inside the tank 11 so as to be drivable by a driving shaft 13 in a vertical direction. Emitted from a light source 14, an active energy ray 15 for curing the photocurable resin composition 10 has its irradiation position changed with a galvanometer mirror 16 controlled by a control section 18 in accordance with slice data on a three-dimensional model to be produced, and is caused to scan the surface of the tank 11. In FIGURE, a scanning range is indicated by thick dashed lines.

The active energy ray 15 to be radiated to the curable resin composition is not particularly limited as long as the active energy ray can cure the curable resin composition according to this embodiment. Specific examples of the active energy ray 15 include: electromagnetic waves, such as an ultraviolet ray, a visible ray, an infrared ray, an X-ray, a gamma ray, and a laser beam; and particle beams, such as an alpha ray, a beta ray, and an electron beam. Of those, an ultraviolet ray is most preferred in terms of an absorption wavelength of a curing agent to be used and facility introduction cost. An exposure amount is not particularly limited, but is preferably 0.001 J/cm$^2$ or more and 10 J/cm$^2$ or less. When the exposure amount is 0.001 J/cm$^2$ or more, the curable resin composition is sufficiently cured. When the exposure amount is 10 J/cm$^2$ or less, an irradiation time is moderate, which is preferred from the viewpoint of productivity.

A method of irradiating the curable resin composition with the active energy ray is not limited to the configuration of FIGURE. When light energy is radiated as the active energy ray, for example, the following methods may be adopted. As a first method, there is given a method that, as illustrated in FIGURE, involves using light focused to a spot, such as laser light, and two-dimensionally scanning the curable resin composition with the light. In this case, the two-dimensional scanning may be performed in a dot-drawing mode, or may be performed in a line-drawing mode. As a second method, there is given a surface exposure mode involving radiating light in a shape of sectional data through use of, for example, a projector. In this case, the active energy ray may be radiated in a planar shape through a planar drawing mask formed by arranging a plurality of micro-optical shutters, such as liquid crystal shutters or digital micro-mirror shutters.

A thickness “d” of the photocurable resin composition 10 to be cured with the active energy ray 15 is a value determined based on the settings at the time of the generation of the slice data, and affects the accuracy of a shaped object 17 to be obtained (reproducibility of shape data on the article to be shaped). The thickness "d" is achieved by the control section 18 controlling the driving amount of the driving shaft 13.

First, the control section 18 controls the driving shaft 13 based on the settings to supply the photocurable resin composition at the thickness "d" onto the shaping stage 12. The curable resin composition in a liquid state on the shaping stage 12 is selectively irradiated with the active energy ray based on the slice data so that a cured layer having a desired pattern may be obtained. Thus, the cured layer is formed. Next, the shaping stage 12 is moved in the direction of the white arrow to cause the curable resin composition that is uncured to be supplied at the thickness "d" to the surface of the cured layer. Then, the active energy ray 15 is radiated based on the slice data to form a cured product integrated with the previously formed cured layer. This step of curing the curable resin composition as a layer is repeated. Thus, the three-dimensional shaped object 17 of interest may be obtained.

The shaped object obtained by the optical shaping method described above is subjected to post-processing as required. Thus, the article is obtained. The post-processing may be, for example, cleaning of the surface of the obtained shaped object with a cleaning agent, such as an organic solvent. In addition, the post-processing may be post-curing involving further subjecting the obtained shaped object to photoirradiation or thermal treatment to cure an unreacted remaining component, which may remain on the surface or inside of the shaped object. Further, the post-processing may be mechanical processing involving, for example, performing surface polishing to straighten out surface irregularities, or forming a screw hole. A plurality of those kinds of processing may be performed in combination.

EXAMPLES

The present disclosure is described in detail below by way of Examples, but the present disclosure is not limited to these Examples.

Materials

Materials used in Examples and Comparative Examples are listed below.

[Component (A)]

A-1: methyl α-allyloxymethylacrylate (manufactured by Nippon Shokubai Co., Ltd., AOMA)

[Component (B)]

B-1: polycarbonate diacrylate; "UH-100DA" (weight-average molecular weight: about 3,000, manufactured by Ube Industries, Ltd.)

B-2: polycarbonate dimethacrylate; "UM-90(⅓)DM" (weight-average molecular weight: about 2,800, manufactured by Ube Industries, Ltd.)

B-3: polyether diacrylate; "BPEM-4" (weight-average molecular weight: about 600, manufactured by DKS Co., Ltd.)

B-4: polyether diacrylate; "ABE-300" (weight-average molecular weight: about 500, manufactured by Shin-nakamura Chemical Co., Ltd.)

B-5: polyester diacrylate; "M-6100" (weight-average molecular weight: about 760, manufactured by Toagosei Co., Ltd.)

B-6: polyester diacrylate; "M-6250" (weight-average molecular weight: about 660, manufactured by Toagosei Co., Ltd.)

B-7: polyester diacrylate; "M-6500" (weight-average molecular weight: about 740, manufactured by Toagosei Co., Ltd.)

B-8: polyester diacrylate; "CN2254-NS" (weight-average molecular weight: about 3,800, manufactured by Sartomer Company Inc.)

[Component (B'): Bifunctional Radically Polymerizable Oligomer Other Than Component (B)]

B'-1: bifunctional urethane acrylate; "CN9001NS" (manufactured by Sartomer Company Inc., weight-average molecular weight: about 5,400)

B'-2: difunctional urethane acrylate; "KUA-PC2T" (manufactured by KSM Co., Ltd., weight-average molecular weight: about 10,000)

[Component (C)]

(1) Monofunctional Radically Polymerizable Compound

C1-1: acryloyl morpholine; "ACMO" (manufactured by KJ Chemicals Corporation)

C1-2: 4-tert-butylcyclohexyl acrylate; "TBCHA" (manufactured by KJ Chemicals Corporation)

C1-1 and C1-2 are monofunctional radically polymerizable compounds.

(2) Polyfunctional Radically Polymerizable Compound

C2-1: 1,6-hexanediol diacrylate

C2-2: tricyclodecanedimethanol diacrylate

C2-3: trimethylolpropane triacrylate

C2-1 to C2-3 are polyfunctional radically polymerizable compounds.

[Component (D)]

D-1: core shell-type rubber particles; "KaneAce (trademark) M-511" (manufactured by Kaneka Corporation, average particle diameter: 200 nm, core portion: cross-linked butadiene rubber, shell portion: acrylic copolymer)

[Component (E)]

E-1: photoradical generator; "Omnirad 819" (manufactured by IGM Resins B.V.)

Production of Curable Resin Composition

The components (A) to (C) were blended at a blending ratio shown in Table 1, and were uniformly mixed. Secondary particulate powder of the component (D) was added into the blend at a blending ratio shown in Table 1. After that, a stirring bar was put into the mixture, and the mixture was stirred with a magnetic stirrer under the condition of 750 rpm for 1 hour to provide a gel-like mixture. After that, the mixture was subjected to dispersion treatment with an ultrasonic homogenizer "UD-200" manufactured by Tomy Seiko Co., Ltd. under the condition of an output of 60 W for 10 minutes twice with an interval of 2 minutes to provide a uniform mixture. After that, a component (E) was added at a blending ratio shown in Table 1, and the whole was uniformly mixed to provide a curable resin composition shown in Table 1.

Production of Test Piece

A cured product was produced from the prepared curable resin composition by the following method. First, a mold having a length of 80 mm, a width of 10 mm, and a thickness of 4 mm was sandwiched between two sheets of quartz glass, and the curable resin composition was poured thereinto. The poured curable resin composition was irradiated with 5 $mW/cm^2$ of an ultraviolet ray through use of an ultraviolet irradiator (manufactured by HOYA CANDEO OPTRONICS CORPORATION, product name: "LIGHT SOURCE EXECURE 3000"). The resultant cured product was subjected to additional post-curing by, for example, ultraviolet ray irradiation or heating as required to the extent that a test piece shape was not deformed. Thus, a test piece having a length of 80 mm, a width of 10 mm, and a thickness of 4 mm was obtained.

Evaluation

[Weight-Average Molecular Weight]

Two Shodex GPC LF-804 columns (manufactured by Showa Denko K.K., exclusion limit molecular weight: $2\times10^6$, separation range: 300 to $2\times10^6$) were arranged in series in a gel permeation chromatography (GPC) apparatus (manufactured by Tosoh Corporation, HLC-8220GPC), and the weight-average molecular weight was measured with a differential refractive index (RI) detector at 40° C. through use of THE as a developing solvent. The weight-average molecular weight thus obtained is a value in terms of standard polystyrene.

[Charpy Impact Strength]

In conformity with JIS K 7111, a 45° cutout (notch) having a depth of 2 mm was formed at the center of the test piece with a cutout-forming machine (manufactured by Toyo Seiki Seisaku-sho, Ltd., product name: "NOTCHING TOOL A-4"). The test piece was fractured from its surface opposite to the cutout with an energy of 2 J through use of an impact tester (manufactured by Toyo Seiki Seisaku-sho, Ltd., product name: "IMPACT TESTER IT"). The energy required for the fracture was calculated from the angle to which a hammer, which had been raised to 150°, swung up after the fracture of the test piece, and was adopted as Charpy impact strength and used as an indicator of impact resistance. The impact resistance was evaluated as described below.

A (extremely satisfactory): 15 $KJ/m^2$ or more.

B (satisfactory): 10 $KJ/m^2$ or more and less than 15 $kJ/m^2$.

C (unsatisfactory): less than 10 $KJ/m^2$.

[Bending Elastic Modulus]

In conformity with JIS K 7171, the test piece was subjected to a three-point bending test (under the conditions of a test speed of 2 mm/min, a distance between support points of 64 mm, an indenter radius of 5 mm, and a support radius of 5 mm) with a tension/compression testing machine (manufactured by A&D Company, Limited, product name: "TENSILON Universal Material Testing Instrument RTF-1250C"), and a bending elastic modulus was calculated from a stress gradient in a measured strain interval of from 0.05% to 0.25%. The bending elastic modulus was evaluated as described below.

A (extremely satisfactory): 2.4 GPa or more.

B (satisfactory): 2 GPa or more and less than 2.4 GPa.

C (unsatisfactory): less than 2 GPa.

[Viscosity]

The obtained curable resin composition was subjected to measurement in the following manner through use of a viscoelasticity-measuring apparatus (MCR 302 manufactured by Anton Paar GmbH). About 0.5 mL of a sample was loaded into the measuring apparatus having attached thereto a cone-plate type measurement jig (diameter: 25 mm·2°), and was adjusted to 20° C. A value obtained under the condition of a shear rate of 5 s-' was adopted as a viscosity. The viscosity was evaluated as described below.

A (extremely satisfactory): less than 200 mPa·s.

B (satisfactory): 200 mPa·s or more and less than 1.000 mPa·s.

C (unsatisfactory): 1.000 mPa·s or more.

TABLE 1

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Composition [part(s) by mass] | Component (A) | A-1 | 80 | 80 | 80 | 75 | 80 | 80 | 80 | 80 | 60 | 60 | 60 |
| | Component (B) | B-1 | 20 | 0 | 0 | 0 | 0 | 0 | 0 | 0 | 20 | 20 | 20 |
| | | B-2 | 0 | 20 | 0 | 0 | 0 | 0 | 0 | 0 | 0 | 0 | 0 |
| | | B-3 | 0 | 0 | 20 | 0 | 0 | 0 | 0 | 0 | 0 | 0 | 0 |
| | | B-4 | 0 | 0 | 0 | 25 | 0 | 0 | 0 | 0 | 0 | 0 | 0 |
| | | B-5 | 0 | 0 | 0 | 0 | 20 | 0 | 0 | 0 | 0 | 0 | 0 |
| | | B-6 | 0 | 0 | 0 | 0 | 0 | 20 | 0 | 0 | 0 | 0 | 0 |
| | | B-7 | 0 | 0 | 0 | 0 | 0 | 0 | 20 | 0 | 0 | 0 | 0 |
| | | B-8 | 0 | 0 | 0 | 0 | 0 | 0 | 0 | 20 | 0 | 0 | 0 |
| | Component (B') | B'-1 | 0 | 0 | 0 | 0 | 0 | 0 | 0 | 0 | 0 | 0 | 0 |
| | | B'-2 | 0 | 0 | 0 | 0 | 0 | 0 | 0 | 0 | 0 | 0 | 0 |
| | Component (C) | C1-1 | 0 | 0 | 0 | 0 | 0 | 0 | 0 | 0 | 20 | 0 | 0 |
| | | C1-2 | 0 | 0 | 0 | 0 | 0 | 0 | 0 | 0 | 0 | 20 | 16 |
| | | C2-1 | 0 | 0 | 0 | 0 | 0 | 0 | 0 | 0 | 0 | 0 | 0 |
| | | C2-2 | 0 | 0 | 0 | 0 | 0 | 0 | 0 | 0 | 0 | 0 | 0 |
| | | C2-3 | 0 | 0 | 0 | 0 | 0 | 0 | 0 | 0 | 0 | 0 | 4 |
| | Component (D) | D-1 | 15 | 15 | 15 | 15 | 15 | 15 | 15 | 15 | 15 | 15 | 15 |
| | Component (E) | E-1 | 1 | 1 | 1 | 1 | 1 | 1 | 1 | 1 | 1 | 1 | 1 |
| Evaluation | Charpy impact strength | Measured value [$kJ/m^2$] | 18.6 | 17.9 | 12.3 | 10.5 | 10.9 | 12.3 | 10.7 | 12.4 | 18.5 | 14.1 | 11.5 |
| | | Evaluation | A | A | B | B | B | B | B | B | A | B | B |
| | Bending elastic modulus | Measured value [GPa] | 2.3 | 2.4 | 2.2 | 2.5 | 2.1 | 2.1 | 2.2 | 2.3 | 2.4 | 2.2 | 2.4 |
| | | Evaluation | B | A | B | A | B | B | B | B | A | B | B |

TABLE 1-continued

| | | | | | | | | | | | | | |
|---|---|---|---|---|---|---|---|---|---|---|---|---|---|
| | Viscosity | Measured value [mPa · s] | 150 | 113 | 120 | 200 | 114 | 122 | 156 | 287 | 125 | 177 | 129 |
| | | Evaluation | A | A | A | B | A | A | A | B | A | A | A |
| | | | Comparative Example | | | | | | | | | | |
| | | | 1 | 2 | 3 | 4 | 5 | 6 | 7 | 8 | 9 | 10 | 11 |
| Composition [part(s) by mass] | Component (A) | A-1 | 80 | 80 | 40 | 40 | 40 | 40 | 40 | 60 | 0 | 80 | 100 |
| | Component (B) | B-1 | 0 | 0 | 20 | 20 | 20 | 20 | 20 | 20 | 20 | 20 | 0 |
| | | B-2 | 0 | 0 | 0 | 0 | 0 | 0 | 0 | 0 | 0 | 0 | 0 |
| | | B-3 | 0 | 0 | 0 | 0 | 0 | 0 | 0 | 0 | 0 | 0 | 0 |
| | | B-4 | 0 | 0 | 0 | 0 | 0 | 0 | 0 | 0 | 0 | 0 | 0 |
| | | B-5 | 0 | 0 | 0 | 0 | 0 | 0 | 0 | 0 | 0 | 0 | 0 |
| | | B-6 | 0 | 0 | 0 | 0 | 0 | 0 | 0 | 0 | 0 | 0 | 0 |
| | | B-7 | 0 | 0 | 0 | 0 | 0 | 0 | 0 | 0 | 0 | 0 | 0 |
| | | B-8 | 0 | 0 | 0 | 0 | 0 | 0 | 0 | 0 | 0 | 0 | 0 |
| | Component (B') | B'-1 | 20 | 0 | 0 | 0 | 0 | 0 | 0 | 0 | 0 | 0 | 0 |
| | | B'-2 | 0 | 20 | 0 | 0 | 0 | 0 | 0 | 0 | 0 | 0 | 0 |
| | Component (C) | C1-1 | 0 | 0 | 0 | 0 | 0 | 0 | 0 | 0 | 0 | 0 | 0 |
| | | C1-2 | 0 | 0 | 0 | 0 | 0 | 20 | 30 | 5 | 80 | 0 | 0 |
| | | C2-1 | 0 | 0 | 40 | 0 | 0 | 0 | 0 | 0 | 0 | 0 | 0 |
| | | C2-2 | 0 | 0 | 0 | 40 | 0 | 0 | 0 | 0 | 0 | 0 | 0 |
| | | C2-3 | 0 | 0 | 0 | 0 | 40 | 20 | 10 | 15 | 0 | 0 | 0 |
| | Component (D) | D-1 | 15 | 15 | 15 | 15 | 15 | 15 | 15 | 15 | 15 | 0 | 15 |
| | Component (E) | E-1 | 1 | 1 | 1 | 1 | 1 | 1 | 1 | 1 | 1 | 1 | 1 |
| Evaluation | Charpy impact strength | Measured value [kJ/m$^2$] | 19.1 | 18.9 | 5 | 3.2 | 6.5 | 7.1 | 7.6 | 8.7 | 3.6 | 3.5 | 2.3 |
| | | Evaluation | A | A | C | C | C | C | C | C | C | C | C |
| | Bending elastic modulus | Measured value [GPa] | 1.8 | 1.8 | 2.5 | 2.7 | 2.8 | 2.5 | 2.2 | 2.6 | 1.4 | 2.8 | 2.7 |
| | | Evaluation | C | C | A | A | A | A | B | A | C | A | A |
| | Viscosity | Measured value [mPa · s] | 118 | 2,000 | 172 | 177 | 116 | 130 | 118 | 154 | 3,200 | 141 | 70 |
| | | Evaluation | A | C | A | A | A | A | A | A | C | A | A |

In Table 1, each number of parts by mass was calculated with respect to 100 parts by mass in total of the radically polymerizable compound(s). The results of the Charpy impact test are shown as the impact resistance evaluation of the cured products of the resin compositions produced at the mixing ratios shown in Table 1, the results of the bending elastic modulus measurement are shown as the elastic modulus evaluation thereof, and the results of the viscosity measurement are shown as the shaping property evaluation thereof. With use of Table 1, the effectiveness of the present disclosure is described with reference to Examples and Comparative Examples.

[Effectiveness of Component (A)]

From the comparison between Example 1 and Comparative Example 9, it can be recognized that the presence of the component (A) significantly contributes to the impact resistance of the cured product, and to the lowering of the viscosity.

[Effectiveness of Component (B)]

From the comparison between Examples 1 to 8 and Comparative Examples 1, 2, and 11, it can be recognized that the presence of the component (B) significantly contributes to the impact resistance of the cured product, and that, by virtue of the component (B) being a bifunctional radically polymerizable oligomer formed of an oligomer moiety in which two or more monomer units are linked together via any one of an ether group, an ester group, and a carbonate group, and two polymerizable functional groups, a high elastic modulus is further exhibited, while comparable performance in terms of elastic modulus cannot be expressed with the urethane oligomer deviating from the scope of the present disclosure.

[Effectiveness of Component (C)]

From the comparison between Examples 9 to 11 and Comparative Examples 3 to 8, it can be recognized that, when the component (C) contained more than 75 parts by mass of the monofunctional polymerizable compound with respect to 100 parts by mass in total of the component (C), the impact resistance of the cured product was satisfactory. Meanwhile, it can be recognized that, when the component (C) contains 25 parts by mass or more of the polyfunctional polymerizable compound with respect to 100 parts by mass in total of the component (C), comparable performance in terms of impact resistance cannot be expressed.

[Effectiveness of Component (D)]

From the comparison between Example 1 and Comparative Example 10, it can be recognized that the presence of the component (D) significantly contributes to the impact resistance of the cured product.

The above-mentioned results have revealed that, in the case of the composition of the present disclosure, the composition has a low viscosity, and hence can be suitably used for optical three-dimensional shaping, and moreover, the cured product thereof can achieve both of impact resistance and a high elastic modulus.

According to the present disclosure, the curable resin composition that is capable of forming a cured product having impact resistance and a high elastic modulus, and has a low viscosity, thereby being suitable for three-dimensional shaping, can be provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A curable resin composition comprising:

(A) an α-(unsaturated alkoxyalkyl) acrylic acid or an ester thereof;

(B) a bifunctional radically polymerizable oligomer;

(D) rubber particles; and (E) a radical polymerization initiator, wherein the component (A) is an α-(unsaturated alkoxyalkyl) acrylic acid or an ester thereof represented by formula (1):

formula (1)

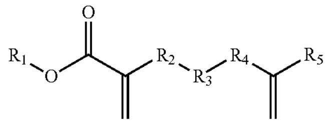

where:

$R_1$ represents a hydrogen atom or an organic group having 1 or more and 30 or less carbon atoms;

$R_2$ represents an alkylene group having 1 or more and 4 or less carbon atoms;

any one of $R_3$ and $R_4$represents an alkylene group having 1 or more and 4 or less carbon atoms, and another thereof represents an oxygen atom; and $R_5$ represents any one of a hydrogen atom, an alkyl group having 1 or more and 4 or less carbon atoms, and an ester group, and wherein the component (B) is a bifunctional radically polymerizable oligomer formed of: an oligomer moiety in which two or more monomer units are linked together via any one of a carbonate group, an ester group, and an ether group; and two polymerizable functional groups and is not a polyfunctional urethane oligomer.

2. The curable resin composition according to claim 1, wherein the component (A) contains an ether structure in its main chain, and that polymerizes while forming a five-membered ring or a six-membered ring.

3. The curable resin composition according to claim 1, wherein the component (A) is one of methyl α-allyloxymethylacrylate or ethyl α-allyloxymethylacrylate.

4. The curable resin composition according to claim 1, wherein the curable resin composition is free of (C) a radically polymerizable compound other than the component (A) and the component (B).

5. The curable resin composition according to claim 4, wherein a content of the component (B) is more than 10 parts by mass with respect to 100 parts by mass in total of the component (A) and the component (B).

6. The curable resin composition according to claim 4, wherein a content of the component (D) is 5 parts by mass or more and 60 parts by mass or less with respect to 100 parts by mass in total of the component (A) and the component (B).

7. The curable resin composition according to claim 1, wherein the curable resin further contains (C) a radically polymerizable compound other than the component (A) and the component (B), and wherein, the component (C) contains a monofunctional radically polymerizable compound at a content of more than 75 parts by mass with respect to 100 parts by mass in total of the component (C).

8. The curable resin composition according to claim 7, wherein a content of the component (A) is more than 70 parts by mass and 100 parts by mass or less with respect to 100 parts by mass in total of the component (A) and the component (C).

9. The curable resin composition according to claim 7, wherein a total content of the component (A) and the component (C) is more than 70 parts by mass and less than 90 parts by mass with respect to 100 parts by mass in total of the component (A), the component (B), and the component (C).

10. The curable resin composition according to claim 7, wherein a content of the component (B) is more than 10 parts by mass with respect to 100 parts by mass in total of the component (A), the component (B), and the component (C).

11. The curable resin composition according to claim 1, wherein the component (B) has a weight-average molecular weight of 400 or more and 5,000 or less.

12. The curable resin composition according to claim 1, wherein the monomer units of the component (B) are each a hydrocarbon group.

13. The curable resin composition according to claim 1, wherein the component (B) is one of polyether di (meth) acrylate or polycarbonate di (meth) acrylate.

14. The curable resin composition according to claim 7, wherein the component (C) contains at least any one of a monofunctional acrylamide-based compound, a monofunctional N-vinyl-based compound, and a monofunctional (meth) acrylate-based compound.

15. The curable resin composition according to claim 7, wherein the component (C) is entirely the monofunctional radically polymerizable compound.

16. The curable resin composition according to claim 7, wherein a content of the component (D) is 5 parts by mass or more and 60 parts by mass or less with respect to 100 parts by mass in total of the component (A), the component (B), and the component (C).

17. The curable resin composition according to claim 1, wherein the component (D) has an average particle diameter of 20 nm or more and 2,000 nm or less.

18. The curable resin composition according to claim 1, wherein the component (D) is rubber particles each having a core-shell structure, and wherein a core of the core-shell structure is formed of any one of a butadiene rubber, a crosslinked butadiene rubber, a styrene/butadiene copolymer rubber, an acrylic rubber, and a silicone/acrylic composite rubber.

19. The curable resin composition according to claim 1 comprising:

optionally (C) a radically polymerizable compound other than the component (A) and the component (B), wherein a total content of the component (A) and the component (C) is more than 70 parts by mass and less than 90 parts by mass with respect to 100 parts by mass in total of the component (A), the component (B), and the component (C), a content of the component (D) is 5 parts by mass or more and 60 parts by mass or less with respect to 100 parts by mass in total of the component (A), the component (B), and the component (C), and when the curable resin composition comprises the component (C), the component (C) contains a monofunctional radically polymerizable compound at a content of more than 75 parts by mass with respect to 100 parts by mass in total of the component (C).

20. A cured product obtained by curing the curable resin according to claim 1.

21. A method of manufacturing an article making use of an optical shaping method, the method comprising:

arranging the curable resin composition according to claim 1 as a layer; and irradiating the photocurable resin composition as a layer with light energy based on slice data on a shaping model to cure the curable resin composition, to thereby shape a shaped object.

22. The curable resin composition according to claim 1, wherein the component (B) has a weight-average molecular weight of 400 or more and 4,000 or less.

* * * * *